(12) United States Patent
Yu et al.

(10) Patent No.: US 7,567,956 B2
(45) Date of Patent: Jul. 28, 2009

(54) DISTRIBUTED META DATA MANAGEMENT MIDDLEWARE

(75) Inventors: Juan Yu, Cranbury, NJ (US); Hasan Timucin Ozdemir, Plainsboro, NJ (US); Lipin Liu, Belle Mead, NJ (US); Kuo Chu Lee, Princeton Junction, NJ (US)

(73) Assignee: Panasonic Corporation, Osaka (JP)

( * ) Notice: Subject to any disclaimer, the term of this patent is extended or adjusted under 35 U.S.C. 154(b) by 341 days.

(21) Appl. No.: 11/354,774

(22) Filed: Feb. 15, 2006

(65) Prior Publication Data

US 2007/0198478 A1  Aug. 23, 2007

(51) Int. Cl.
  *G06F 17/30* (2006.01)
(52) U.S. Cl. ......................... 707/3; 707/104.1
(58) Field of Classification Search ........................ None
  See application file for complete search history.

(56) References Cited

U.S. PATENT DOCUMENTS

| | | | |
|---|---|---|---|
| 6,073,218 A | 6/2000 | DeKoning et al. | |
| 6,154,765 A | 11/2000 | Hart | |
| 6,502,174 B1 | 12/2002 | Beardsley et al. | |
| 6,633,869 B1 | 10/2003 | Duparcmeur et al. | |
| 6,665,675 B1 | 12/2003 | Mitaru | |
| 6,678,700 B1 | 1/2004 | Moore et al. | |
| 6,704,750 B2 | 3/2004 | Asazu et al. | |
| 6,910,052 B2 | 6/2005 | Gates et al. | |
| 6,941,510 B1 | 9/2005 | Ozzie et al. | |
| 6,963,920 B1 | 11/2005 | Hohmann et al. | |
| 6,965,925 B1 | 11/2005 | Shank et al. | |
| 6,970,903 B1 | 11/2005 | Toivonen | |
| 2003/0088711 A1* | 5/2003 | Tabares et al. | 709/321 |
| 2003/0105746 A1* | 6/2003 | Stickler | 707/3 |
| 2006/0031386 A1* | 2/2006 | Burbeck | 709/217 |
| 2006/0253411 A1* | 11/2006 | Roy-Chowdhury et al. | 707/1 |
| 2007/0182818 A1* | 8/2007 | Buehler | 348/143 |

* cited by examiner

*Primary Examiner*—Pierre M Vital
*Assistant Examiner*—Truong V Vo
(74) *Attorney, Agent, or Firm*—Harness, Dickey & Pierce, PLC

(57) ABSTRACT

A meta data management system for use with a surveillance system includes a user interface that allows users to define rules to manage meta data from distributed devices. An application programming interface provides an application access to system data and control information. A mechanism allows the application to transparently and seamlessly integrate with different types of databases by transparently allocating and searching the data that are physically distributed at different devices.

35 Claims, 6 Drawing Sheets

DISTRIBUTED META DATA MANAGEMENT MIDDLEWARE

FIELD

The present disclosure generally relates to surveillance systems, and relates in particular to meta data management middleware for use with surveillance systems.

BACKGROUND

The statements in this section merely provide background information related to the present disclosure and may not constitute prior art.

A surveillance system is usually composed of different types of devices. Each device provides certain functionalities, image data, and meta data information. To control those devices, to acquire the data from devices, and to store those data information into the data sources, the surveillance system application developers need to make a great deal of effort to learn and implement different access APIs and data access modules for particular data sources in order to integrate the entire surveillance system. Thus, the development cost for such systems can be quite high.

In addition, since the meta data may be distributed all over the network of the surveillance systems, it is difficult for the application programs to know where those data resided, and it is inefficient for the application programs to search each instance of data. For example, when a surveillance system is deployed, different databases that store the meta data are likely used for such a system. This database diversity requires each application to define different types of data schema for the different databases. XML has emerged as a standard data-exchange approach for many applications. Thus, these applications require the data management involving XML. However, the existing data source management continues to be relational or other types of DB. The current system lacks of a bridge to satisfy the requirement of these new XML-based applications leveraging existing data sources, such as a relational DB. This lack causes high deployment costs.

SUMMARY

A meta data management system for use with a surveillance system includes a user interface that allows users to define rules to manage meta data from distributed devices. An application programming interface provides an application access to system data and control information. A mechanism allows the application to transparently and seamlessly integrate with different types of databases by transparently allocating and searching the data that are physically distributed at different devices.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

A Meta Data Management (MDM) system serves as a platform to support a system integrator to easily manipulate the meta data from the devices. MDM is a rule-driven component that allows users to define rules to manage the meta data from the devices. This capability makes the system more customizable for different business needs (e.g., customizing the recognized subjects as avoided or preferred depending on different business needs). MDM can rely on the P2P communication protocol to provide distributed searching capability.

Figure 1:
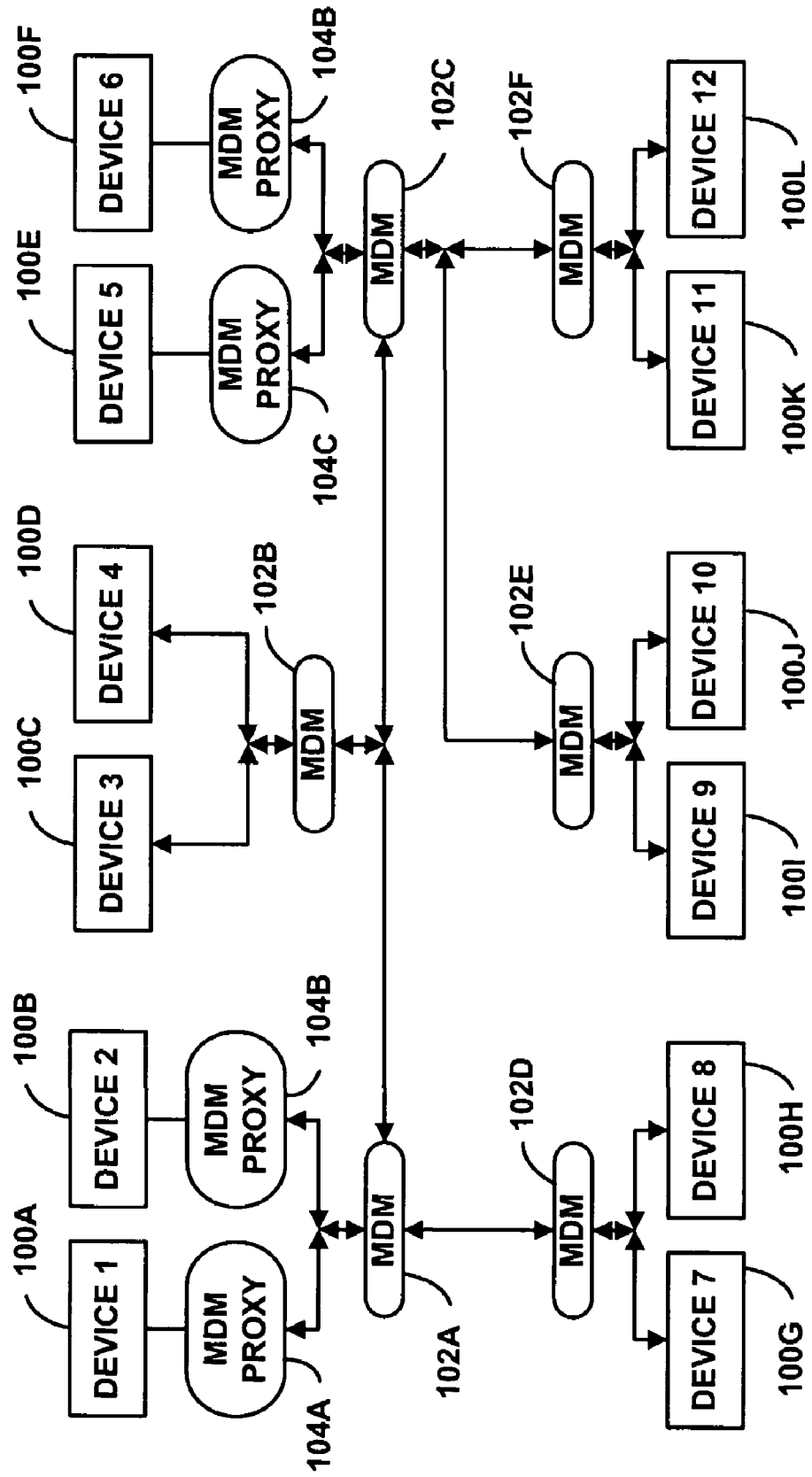
FIG. 1 is a block diagram illustrating an overview of meta data management for a surveillance system.

Referring to FIG. 1, a surveillance system architecture can include a number of devices 100A-L. When a number of devices of different applications are deployed over a distributed network, the MDM (Meta Data Management) 102A-F and MDM Proxy 104A-D are created to facilitate the communications, interoperability, and management among the devices and applications.

Figure 2:
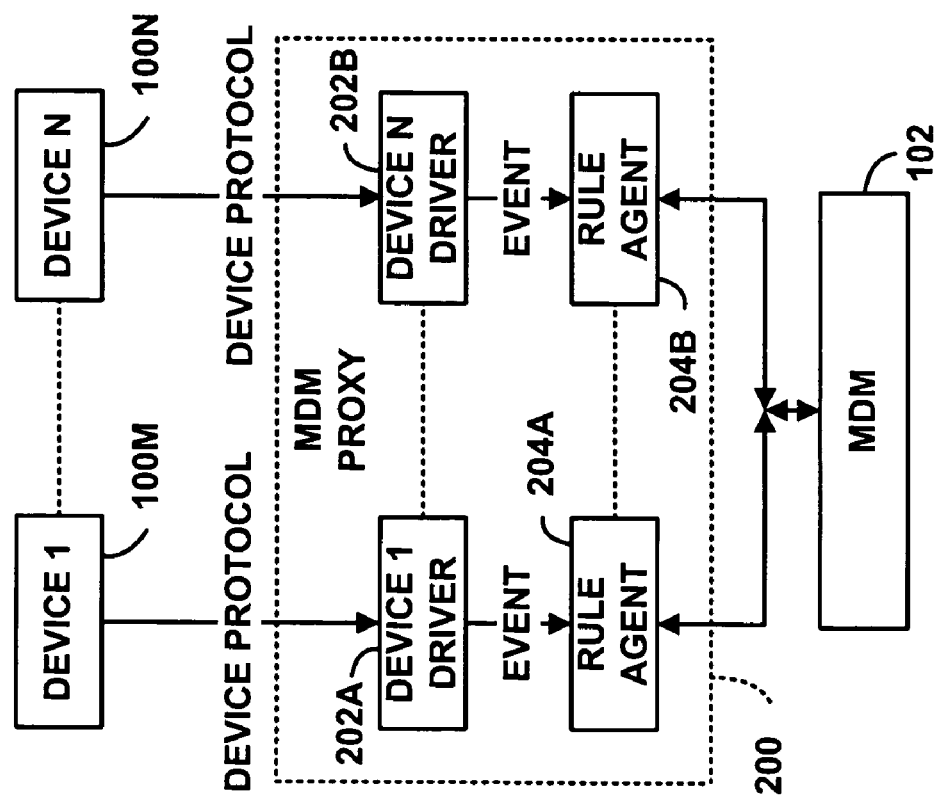
FIG. 2 is a block diagram illustrating components of a meta data management proxy.

Turning now to FIG. 2, the Meta Data Management Proxy (MDM Proxy) 200 communicates with Meta Data Management 102 for those devices 100M-N that can not directly communicate with Meta Data Management using a Meta Data Management Protocol. XML has emerged as the standard data-exchange format for the many applications. XML can therefore be used to define communication protocols which allow many different kinds of peers to participate in one protocol. The data input into or output from Meta Data Management can be formatted as XML. Meta Data Management Proxy can convert the device data to XML format.

The Meta Data Management Proxy can be developed as a rule engine to execute the rules defined by the applications. A rule engine can have three types of components, including device drivers 202A and 202B, condition evaluators and action interpreters. Condition evaluators and action interpreters can be combined in the form of rule agents 204A and 204B. A rule and a device driver are formatted as XML files. They are managed as XML files in the configuration server. They can be dynamically loaded from a configuration server. Since each device 100M-N can have its own communication protocol, the device driver can collect data from each device, parse the data and generate one or more events. The condition evaluator can evaluate and check the defined condition to trigger the execution of the associated actions. The rule engine can invoke actions which are defined and implemented by the applications.

For example, the action interpreting component can implement Meta Data Management communication protocol to send meta data that are extracted from devices, to Meta Data Management. Action interpreting component can also implement other communication protocols to communicate with other network devices. Since Meta Data Management Proxy is running as a rule engine, the applications have the flexibility to extend the Meta Data Management Proxy capability beyond the communication.

Figure 3:
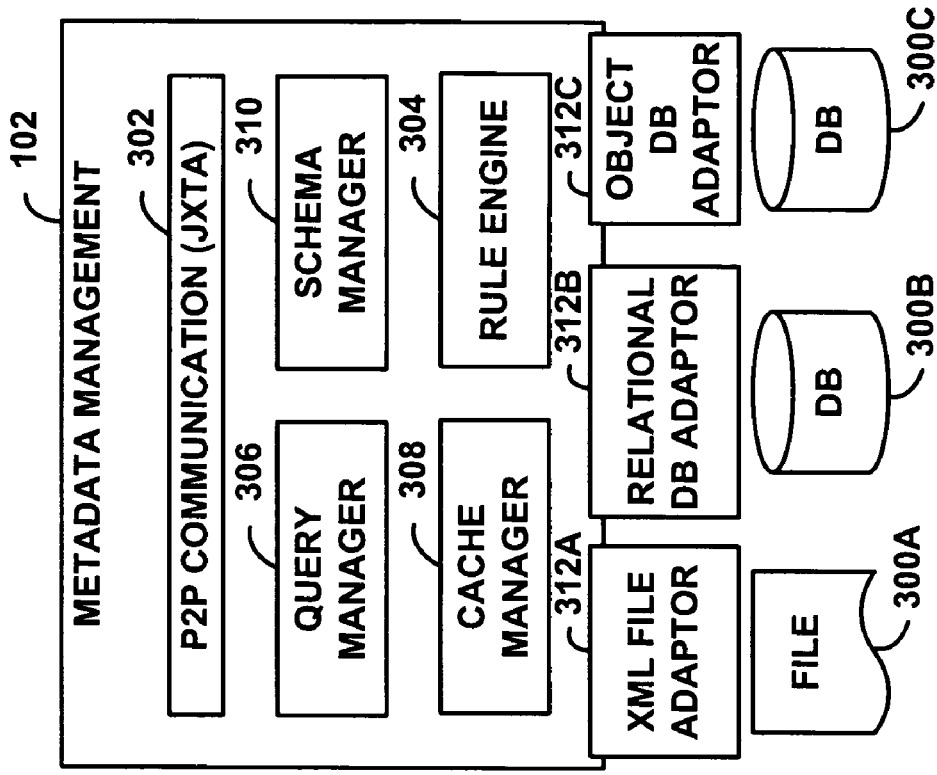
FIG. 3 is a block diagram illustrating an overview of meta data management (MDM).

Referring now to FIG. 3, Meta Data Management (MDM) 102 provides an easy interface for the application to access system data and control information, and can provide the mechanism for the application to transparently and seamlessly integrate with the different types of databases (DBs) 300A-C. Meta Data Management 102 can be implemented as a library that handles various system information, video information, control information, authentication information, and other types of information.

Meta Data Management Library (MDM Library) can have several components. For example, it can have a communication component 302 that can implement P2P communication protocol to provide a distributed communication environment for the distributed access data functionality. The MDM Library can also have a Rule Engine 304 which executes the rules—application logic defined by applications. Further, MDM Library can have a query manager 306 that can generate a unique query identification, execute queries, maintain query data source sessions, and aggregate the query results from the distributed data source. Still further, MDM Library can have a cache manager 308 that manages the meta data object in-memory from a data source using, for example, FIFO, LFU, and/or LRU management policies for fast search and event correlation. Yet further, MDM Library can have a schema manager 310 that can record and maintain the peer group's schemas to support the query manager in performing the distributed search. Finally, the MDM Library can have multiple DB adaptors 312A-C that can provide one or more bridges to let a relational DB or other type of DB handle XML based application data.

Communications between MDMs can be implemented using a peer-to-peer (P2P) communication model. Developing JXTA to establish a P2P communication model in a distribute computation environment allows archiving of real time pattern matching from the distribute environment. The P2P communication model has decentralized, autonomous, and distributed computation characteristics that enable the devices or clients to take initiative, rather than always being passively invoked.

Figure 4:
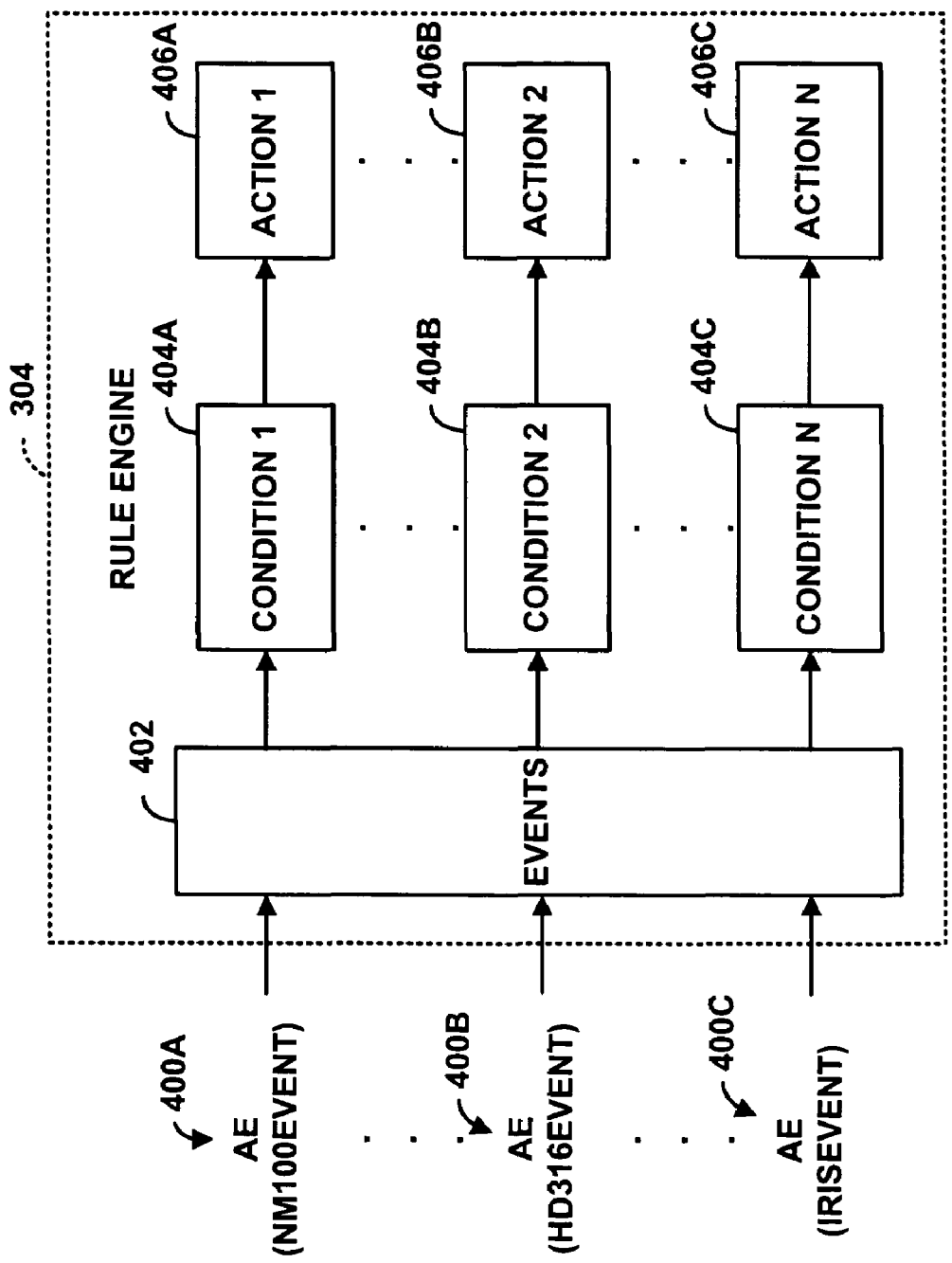
FIG. 4 is a flow diagram illustrating rule engine execution flow.
Figure 5:
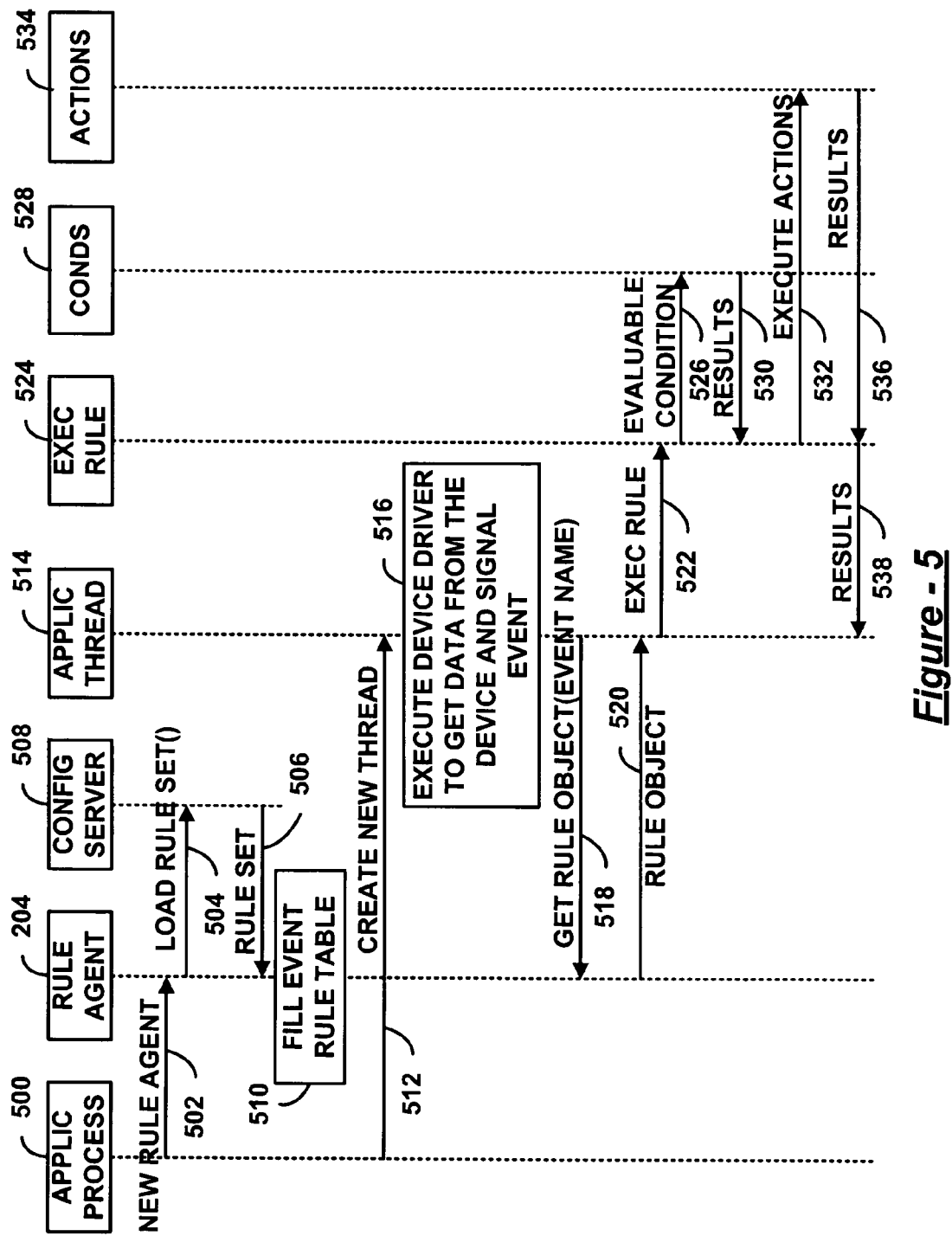
FIG. 5 is a swim lane diagram illustrating an example of how an application can run the rule engine.

Turning now to FIGS. 4 and 5, the rule engine 304 can receive an event 400A-C from the communication component, evaluate the condition, and perform an action according to the result of evaluation of the condition. The rule engine can have a generic event handler 402 that can read a rule or rules specifying how many event handlers exist and the configuration for each event handler. Next it can load a template for each event handler and fit all properties into the template from the configuration. Finally it can let each event handler handle the event. Each event handler feeds the event to rule execution engine.

Regarding condition checking, rule engine evaluates the condition at 404A-C when it receives the event from a generic event handler. The implementation of conditions can be left to the user, thus providing a lot of flexibility to the user. For example, the user can set a property, which can load a specific parser for an event. It can check the schema and return the evaluation result.

Regarding actions, solution integrator can implement any kind of action 406A-C for the surveillance system application. For example, a correlation action can correlate the meta data from different devices, fuse the information, and perform target tracking.

In an example of operation, an application process 500 can instantiate at 502 a new rule agent 204, which can load at 504 a rule set 506 from configuration server 508 and fill an event rule table at 510. Meanwhile, application process 500 can at 512 create a new thread 514, which can execute a device driver at 516 to get data from the device and signal an event. Thread 514 can then get at 518 a rule object 520 from rule agent 204 and begin at 522 a rule execution process 524. Execution process 524 can proceed by passing at 526 an evaluable condition to a condition checking process 528, and receive results 530 in return. Rule execution process 524 can then issue action execution commands 532 to an action execution process 534, and receive results 536, which are relayed at 538 to thread 514.

Cache manager can create and delete cache object based on the configuration data. The configuration data can include the max size of the cache and what kind of policy, such as FIFO, LRU and/or LFU, is used for managing the cache. Cache information can be kept in a cache table.

The cache can have two major functions. One function can be to store objects and provide the concurrently and thread safe accessing methods to operate on objects. Another function, which can be a separate thread, can be to maintain cached objects based on the FIFO or LRU or LFU policy.

A cache object can maintain the meta data and a working set of meta data objects to provide fast and synchronized access control into elements of meta data objects retrieved from the Data source. Read operation can traverse and access different elements of the meta data in memory directly without going in and out of the DB for a large data file. The cache manager can provide a minimal level of access control needed to maintain the data consistency on top of DB. The cache manager can provide methods for the rule engine to cache the rules in memory and cache meta data for correlation and fast searching.

Figure 6:
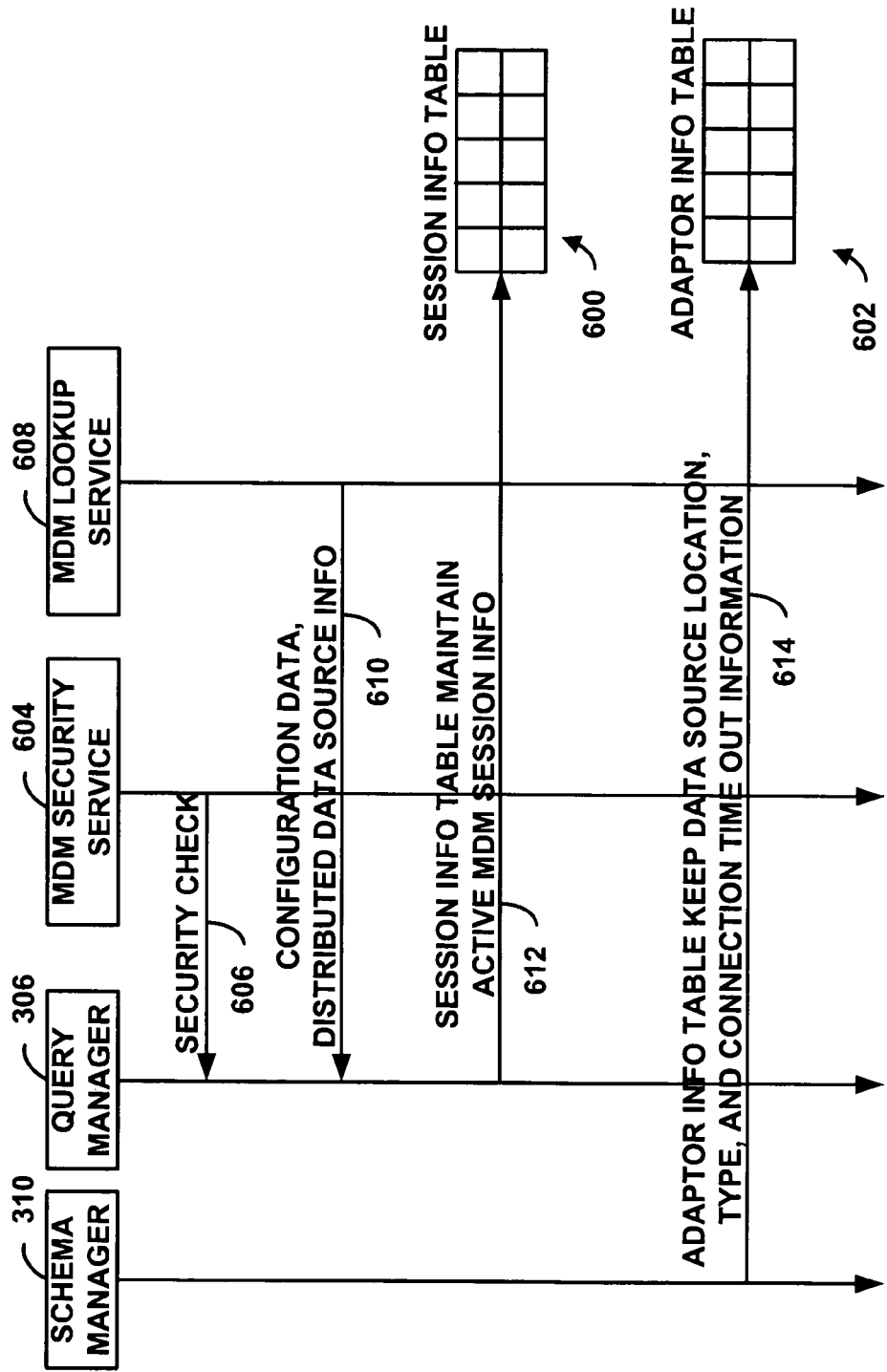
FIG. 6 is a swim lane diagram illustrating query manager operation flow.

Turning now to FIG. 6, query manager 306 can be created as a single instance which can be shared by multiple applications in the same JVM. A query manager object can have a table 600 named, for example, SessioninfoTable to keep at 612 active query sessions information, which can be stored in a Sessioninfo object. The query manager 306 can also have a table 602 named, for example, AdaptorInfoTable to cache at 614 adaptors and collections information configured in a schema manager 310 configuration file. Query manager 306 can get the timeout configuration parameter for each session, and can authenticate a query application.

In operation, an MDM security service 604 can perform a security check 606 with query manager 306. Meanwhile, an MDM lookup service 608 can provide and/or reference at 610 configuration data and distributed data source information via query manager 306. Thus, query manager 306 can be configured to handle security checks and lookup query functions.

Figure 7:
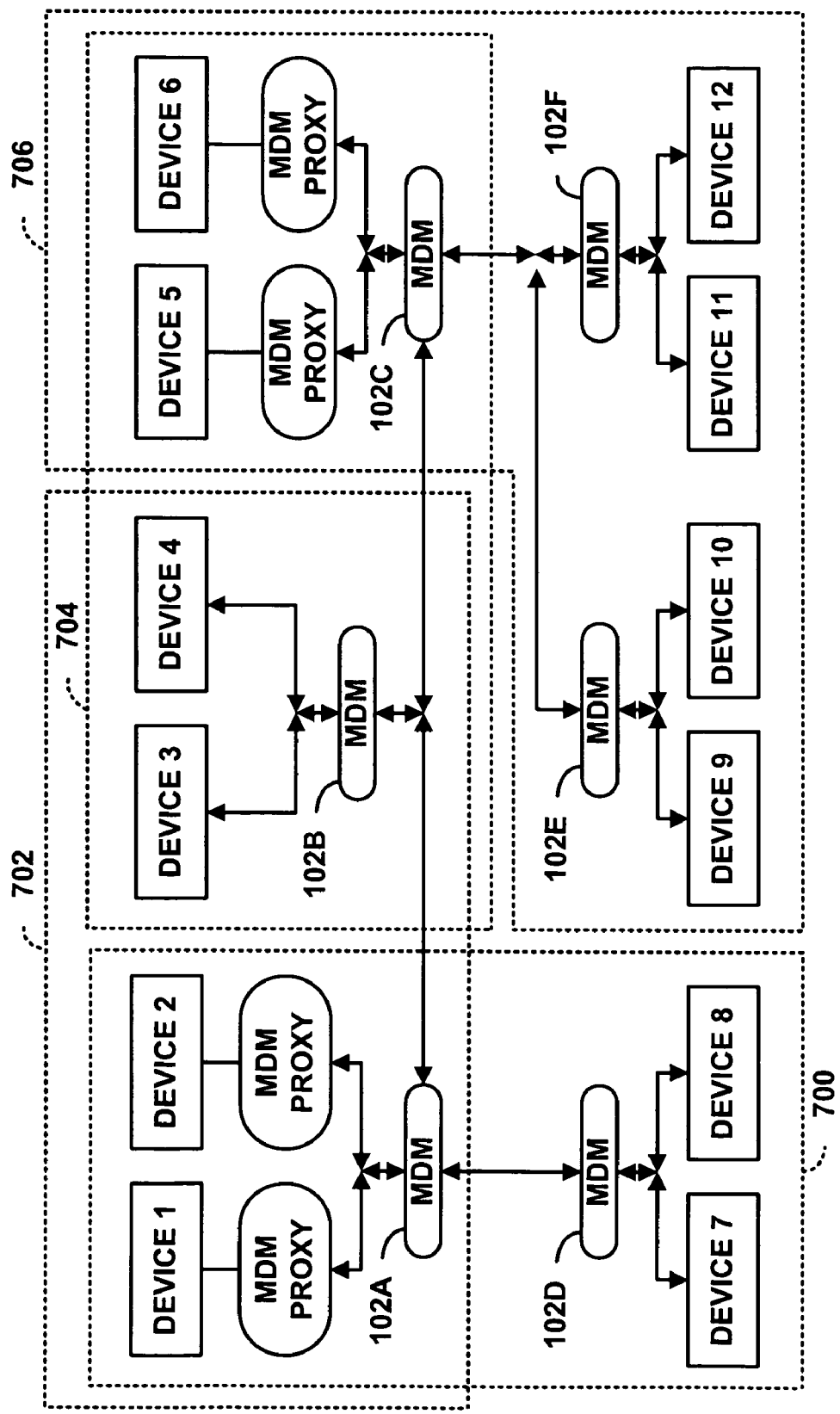
FIG. 7 is a block diagram illustrating a query manager distributed search operation.

Turning now to FIG. 7, MDM can be configured into peer groups. For example, MDM 102A and MDM 102D can be configured in a first peerGroup 700, while MDM 102A and MDM 102B can be configured in a second peer group 702. Meanwhile, MDM 102B and MDM 102C can be configured in a third peer group 704, and MDM 102C, MDM 102E, and MDM 102F can be configured in a fourth peer group 706.

When MDMs are initialized, they can advertise their resources to the peer group. Based on the example configuration, MDM 102A can be interested in requests from MDM 102D and MDM 102B, while MDM 102B can be interested in query requests from MDM 102A and MDM 102C. Similarly, MDM 102C can be interested in requests from MDM 102B, MDM 102E, and MDM 102F.

When the application creates the data source schema, the query manager of each MDM can send the data source schema information to the peer group, and schema manager can keep the schema information and correlated peer information in a table. Thus, each MDM can have schema from the peer group. If the application issues a query from one MDM, (e.g., from MDM 102A, the query manager of MDM 102A can send the request to MDM 102C and MDM 102B, since MDM 102A is in the same peer group with MDM 102D and MDM 102B. The query manager of MDM 102B can check with its schema manager to see if there is another peer having the same schema. For example, the schema manager of MDM 102B can find out that MDM 102C has the same schema, so that the query request can also be sent to MDM 102C and so on. The query manager of MDM 102A can wait for the results from MDM 102D and MDM 102B, aggregate the results, and send the aggregated results back to the application.

The schema manager can manage the schemas to support the distributed search. It can maintain a Hash table to support concurrent addition, deletion, update, and query of the schema information correlated with peer information.

The DB adaptors can map an XML request from the MDM core to a local query format of metadata repository management and translate the results to an XML format. A metadata repository layer can store the metadata and support multi-connections to a data base management system.

Various embodiments of the meta data management middleware can provide several advantages. For example, the middleware can provide interoperability of various device data. In particular, it can use universal XML to support different types of device data for different application domains, to format device driver program and rules to support the dynamic configuration of program structure and behavior inside of a running program and unify database via access application program interfaces to support changeable data sources. Also, it can provide distributed search capabilities, including an independent distributed search function from a data source implementation, and a flexible and efficient searching mechanism. Finally, it can provide lower costs and faster implementation for two reasons. Firstly, it can provide easy APIs and universal XML model, so that implementation costs can be very low compare to the middleware package from database vendors. Secondly, since MDM is a light weight middleware, it can reduce the time of implementation work.

What is claimed is:

1. A metadata management system comprising:
    a surveillance application;
    a plurality of distributed devices, wherein each of the plurality of distributed devices provides surveillance contents and provides metadata associated the surveillance contents through a respective different data communication protocol including a predetermined markup language format, wherein each of the plurality of distributed devices is associated with a first rule specific to that device and a device driver for data communication through the respective different data communication protocol with that device;
    a plurality of distributed databases that have at least two data storage formats and that each selectively store and manage metadata provided by the plurality of distributed devices;
    a metadata management proxy, embodied as computer executable instructions on a memory of a computing device, that is remote from the plurality of databases and in data communication with at least one of the plurality of distributed devices;
    a middleware metadata management mechanism that is embodied as computer executable instructions on a memory of a computing device and that directs data communication between the metadata management proxy and the plurality of databases, wherein the metadata management mechanism is further associated with a second rule and communicates through a metadata management communication protocol, wherein the second rule defines conditions of surveillance concerns and data storage formats both for storing metadata to each of the plurality of databases, wherein the metadata management mechanism has at least two distributed entities that communicate with each other through the metadata management communication protocol; and
    a configuration server that stores a) the first rule and the device driver associated with each of the plurality of distributed devices and b) the second rule, wherein the configuration server further allows users to dynamically update of the first rules, the device drivers, and second rule;
    wherein the metadata management proxy a) dynamically loads the first rule and the device driver both associated with the at least one device from the configuration server, b) receives the metadata from each of the at least one device utilizing the device driver and through the associated respective data communication protocol both associated with the at least one device, c) parses the received metadata to generate an event, and d) triggers an action, of the surveillance application, in response to that event in accordance with the first rule specific to that device;
    wherein the metadata management proxy further selectively sends the metadata, for each of the at least one device, to the metadata management mechanism through the metadata management communication protocol;
    wherein the metadata management mechanism dynamically loads the second rule from the configuration server and selects at least one from the plurality of distributed databases and at least one of the data storage formats for storing the received metadata based on if the received metadata satisfy the defined conditions of surveillance concerns for at least one of the plurality of databases in the second rule.

2. The system of claim 1, wherein the metadata management proxy is implemented as a rule engine having device drivers, condition evaluators, and action interpreters.

3. The system of claim 2, wherein said rule engine dynamically loads the first rules from the configuration server and runs the first rules to accept different types of messages and invoke different actions based on the results of condition evaluators without stop and restart of distributed search applications or a machine.

4. The system of claim 2, wherein one or more of the device drivers collects data from multiple ones of the distributed devices by using device specific communication protocols, parses the data, and generates one or more events, wherein the device drivers are formatted as XML files and are managed as XML files in the configuration server.

5. The system of claim 4, wherein one or more of the condition evaluators can evaluate and check a defined condition associated with one of the events to trigger execution of an associated action interpreter.

6. The system of claim 1, wherein said the metadata management mechanism is implemented as a library that handles at least one of system information, video information, control information, or authentication information.

7. The system of claim 6, wherein the library has a communication component that can implement P2P communication protocol to provide a distributed communication environment for distributed data access functionality.

8. The system of claim 6, wherein the library has a rule engine which executes the rules.

9. The system of claim 6, wherein the library has a query manager that can generate a unique query identification, execute queries, maintain query data source sessions, and aggregate query results from distributed data sources.

10. The system of claim 6, wherein the library has a cache manager that manages a metadata object in-memory from a data source using one or more management policies for fast search and event correlation.

11. The system of claim 6, wherein the library has a schema manager that can record and maintain a peer group's schemas to support a query manager in performing a distributed search.

12. The system of claim 1, wherein said the metadata management mechanism includes a rule engine that can receive an event, evaluate a condition associated with the event, and perform an action according to a result of evaluation of the condition.

13. The system of claim 12, wherein the rule engine has a generic event handler that can read a rule specifying how many event handlers exist and a configuration for each event handler, load a template for each event handler, and fill all properties into the template from the configuration.

14. The system of claim 13, wherein the generic event handler can let each event handler handle the event, and each event handler feeds the event to a rule execution engine.

15. The system of claim 1, wherein said metadata management mechanism includes a query manager that is created as a single instance and shared by multiple applications.

16. The system of claim 15, wherein the query manager stores active query sessions information, database adaptors, and collections information configured in a schema manager configuration file and the query manager gets a timeout configuration parameter for each session, and authenticates a query application.

17. The system of claim 1, wherein said metadata management system is operable to advertise its resources to a peer group into which it is configured.

18. The system of claim 17, wherein when the application creates a data source schema, a schema manager of said system sends the data source schema information to the peer group.

19. The system of claim 17, wherein if the application issues a query from said meta data management system, said system can send the query to other metadata management systems in its peer group.

20. The system of claim 19, wherein said metadata management system can wait for query results from the other meta data management systems in its peer group, aggregate the results, and send the results to the application.

21. The system of claim 17, wherein if said metadata management system receives a query from another metadata management system in one of its peer groups, it can check its schema information to identify one or more additional metadata management systems in another of its peer groups, and can relay the query to the additional metadata management systems.

22. The system of claim 21, wherein said metadata management system can wait for query results from the still other metadata management systems, aggregate the results, and send the results to the other meta data management system form which it received the query.

23. The system of claim 17, wherein said metadata management system has a schema manager that can manage peer group schemas to support distributed search.

24. The system of claim 23, wherein the schema manager maintains a Hash table to support concurrent addition, deletion, update, and query of schema information correlated with peer information.

25. The system of claim 1, wherein said the metadata management mechanism includes one or more database adaptors that map an XML request to a local query format of metadata repository management and translate results to an XML format.

26. The metadata management system of claim 1, wherein the metadata management proxy further employs a first rule engine for converting the received metadata from each of the at least one device to the predetermined markup language format in accordance with the first rule specific to that device;
   wherein the first rule engine dynamically loads the device driver of that device and further includes a condition evaluator and an action interpreter;
   wherein the first rule engine selectively accepts messages from that device in accordance with the first rule of that device via the device driver of that device, wherein the messages contain the metadata of that device;
   wherein the condition evaluator evaluates the messages and invokes at least one of a plurality of actions in accordance with the first rule of that device for converting the metadata in the messages to the predetermined markup language format;
   wherein the action interpreter executes the invoked actions to selectively send the metadata received from that device to the metadata management mechanism.

27. The metadata management system of claim 1, wherein the metadata management mechanism further employs a second rule engine for selectively storing the received metadata, from the metadata management proxy, in a selected data format to one of the plurality of databases in accordance with the second rule;
   wherein the second rule engine receives an event defined in the second rule and associated with the received metadata, evaluates a condition associated with the event in accordance with the second rule, and performs an action defined in the second rule according to a result of evaluation of the condition to selectively store the received metadata, from the metadata management proxy, in the selected data format to one of the plurality of databases;
   wherein the second rule further defines correlation actions that correlate metadata from different devices of the plurality of distributed devices to perform target tracking.

28. The metadata management system of claim 27, wherein the second rule engine further has a generic event handler that selectively reads the second rule specifying how many event handlers exist and a configuration for each event handler, loads a template for each event handler, and fills all properties into the template from the configuration.

29. The metadata management system of claim 1, wherein the metadata management mechanism has a plurality of database adaptors including an XML file adaptor, a relational database adaptor, and an object database adaptor that interface with different types of databases of the plurality of databases, each adaptor maps a data request from a markup language format to a data scheme used by one of the plurality of databases.

30. The metadata management system of claim 1, wherein a) the first rule and the device driver associated with each of the plurality of devices and b) the second rule are stored in a markup language format.

31. The metadata management system of claim 1, wherein the middleware metadata management mechanism has an application programming interface providing an application access to metadata management functions the metadata management mechanism including transparently allocating and searching the metadata that are physically distributed at the plurality of distributed databases.

32. The metadata management system of claim 1, wherein the at least two distributed entities of the middleware metadata management mechanism are grouped into a plurality of peer groups and each control at least one of the plurality of distributed databases, wherein the respective distributed entities in each of the peer groups advertise resources hosted on the databases controlled by the respective distributed entities to each other.

33. The metadata management system of claim 32, wherein each of the at least two distributed entities of the middleware metadata management mechanism is associated with a data source schema that describes the metadata stored in the databases controlled by that entity, wherein any given entity of the at least two distributed entities each has a respective schema manager that locally maintains copies of each of the data source schemas associated with the other entities in the same peer group of the given entity, wherein the schema manager of the given entity searches its locally maintained data source schemas to locate data source schemas therein similar to the data source schema associated with the given entity and sends a received query request, for locating metadata stored in the plurality of distributed databases, to the entities associated with the located data source schemas.

34. The metadata management system of claim 33, wherein the schema manager of the given entity locally maintains, in a Hash table, the copies of each of the data source schemas associated with the other entities in the same peer group of the given entity.

35. A metadata management system for managing surveillance contents and metadata associated the surveillance contents provided by a plurality of distributed devices and stored in a plurality of distributed databases, the system comprising:
  a metadata management proxy embodied as computer executable instructions on a memory of a computing device and in data communication with at least one of the plurality of distributed devices;
  a middleware metadata management mechanism that is embodied as computer executable instructions on a memory of a computing device and that directs data communication between the metadata management proxy and the plurality of distributed databases, wherein the metadata management mechanism is further associated with a second rule, wherein the second rule defines conditions of surveillance concerns and data storage formats both for storing metadata to each of the plurality of databases, wherein the metadata management mechanism has an application programming interface providing an application access to metadata management functions the metadata management mechanism including transparently allocating and searching the metadata that are physically distributed at the plurality of distributed databases; and
  a configuration server that stores a) a first rule and a device driver associated with each of the plurality of distributed devices and b) the second rule, wherein the configuration server further allows users to dynamically update of the first rules, the device drivers, and second rule;
  wherein the metadata management proxy receives the metadata from each of the at least one device, dynamically loads the first rule specific to that device from the configuration server, and converts the received metadata to a predetermined markup language format in accordance with the first rule specific to that device;
  wherein the metadata management proxy further selectively sends the converted metadata, for each of the at least one device and in the predetermined markup language format, to the metadata management mechanism in accordance with the first rule specific to that device;
  wherein the metadata management mechanism dynamically loads the second rule from the configuration server and selects at least one from the plurality of distributed databases and at least one of the data storage formats for storing the received metadata based on if the received metadata satisfy the defined conditions of surveillance concerns for at least one of the plurality of databases in the second rule.

* * * * *